(12) United States Patent
Morizumi

(10) Patent No.: US 9,531,899 B2
(45) Date of Patent: Dec. 27, 2016

(54) IMAGE FORMING APPARATUS TO REDUCE POWER CONSUMPTION, CONTROL METHOD FOR THE SAME AND RECORDING MEDIUM

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Kenta Morizumi, Fuji Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/712,232

(22) Filed: May 14, 2015

(65) Prior Publication Data

US 2016/0337541 A1  Nov. 17, 2016

(51) Int. Cl.
*G06F 15/00* (2006.01)
*G06F 3/12* (2006.01)
*G06K 1/00* (2006.01)
*H04N 1/00* (2006.01)
*H04N 1/44* (2006.01)

(52) U.S. Cl.
CPC ........ *H04N 1/00904* (2013.01); *H04N 1/0097* (2013.01); *H04N 1/00891* (2013.01); *H04N 1/00896* (2013.01); *H04N 1/4433* (2013.01); *H04N 2201/0094* (2013.01)

(58) Field of Classification Search
CPC ............ H04N 1/00904; H04N 1/00891; H04N 1/00896; H04N 1/0097; H04N 1/4433; H04N 2201/0094
USPC .................................................. 358/1.1–1.18
See application file for complete search history.

(56) References Cited

U.S. PATENT DOCUMENTS 8,576,422 B2 * 11/2013 Kimura ................. G06F 3/1204
358/1.14
9,143,649 B2 * 9/2015 Motosugi ............... G06K 15/00

FOREIGN PATENT DOCUMENTS

JP       2010-073018       4/2010

* cited by examiner

*Primary Examiner* — Douglas Tran
(74) *Attorney, Agent, or Firm* — Amin, Turocy & Watson LLP; Gregory Turocy

(57) ABSTRACT

In accordance with an embodiment, an image forming apparatus comprises a plurality of blocks configured to be capable of executing a plurality of jobs; a power supply control section configured to control the feeding of electric power to the plurality of blocks; an authentication section configured to authenticate a user; a storage section configured to store use frequency information of each of the plurality of jobs generated based on the information when the user executes the jobs; and a control section configured to acquire the use frequency information of the user authenticated by the authentication section from the storage section, and control to feed, when there is a job of which the acquired use frequency is higher than a given frequency, electric power to only the blocks that are required to execute the job.

10 Claims, 6 Drawing Sheets

FIG.3

| USER | COPY | PRINT | SCAN |
|---|---|---|---|
| A | 80% | 10% | 10% |
| B | 10% | 80% | 10% |
| C | 10% | 10% | 80% |
| D | 40% | 40% | 20% |
| E | 40% | 20% | 40% |

FIG.4

| USER | COPY | | PRINT | | SCAN | |
|---|---|---|---|---|---|---|
| | AM | PM | AM | PM | AM | PM |
| A | 80% | 20% | 10% | 40% | 10% | 40% |
| B | 20% | 10% | 40% | 80% | 40% | 10% |
| C | 10% | 30% | 10% | 30% | 80% | 40% |
| D | 50% | 20% | 30% | 40% | 20% | 40% |
| E | 40% | 40% | 20% | 40% | 40% | 20% |

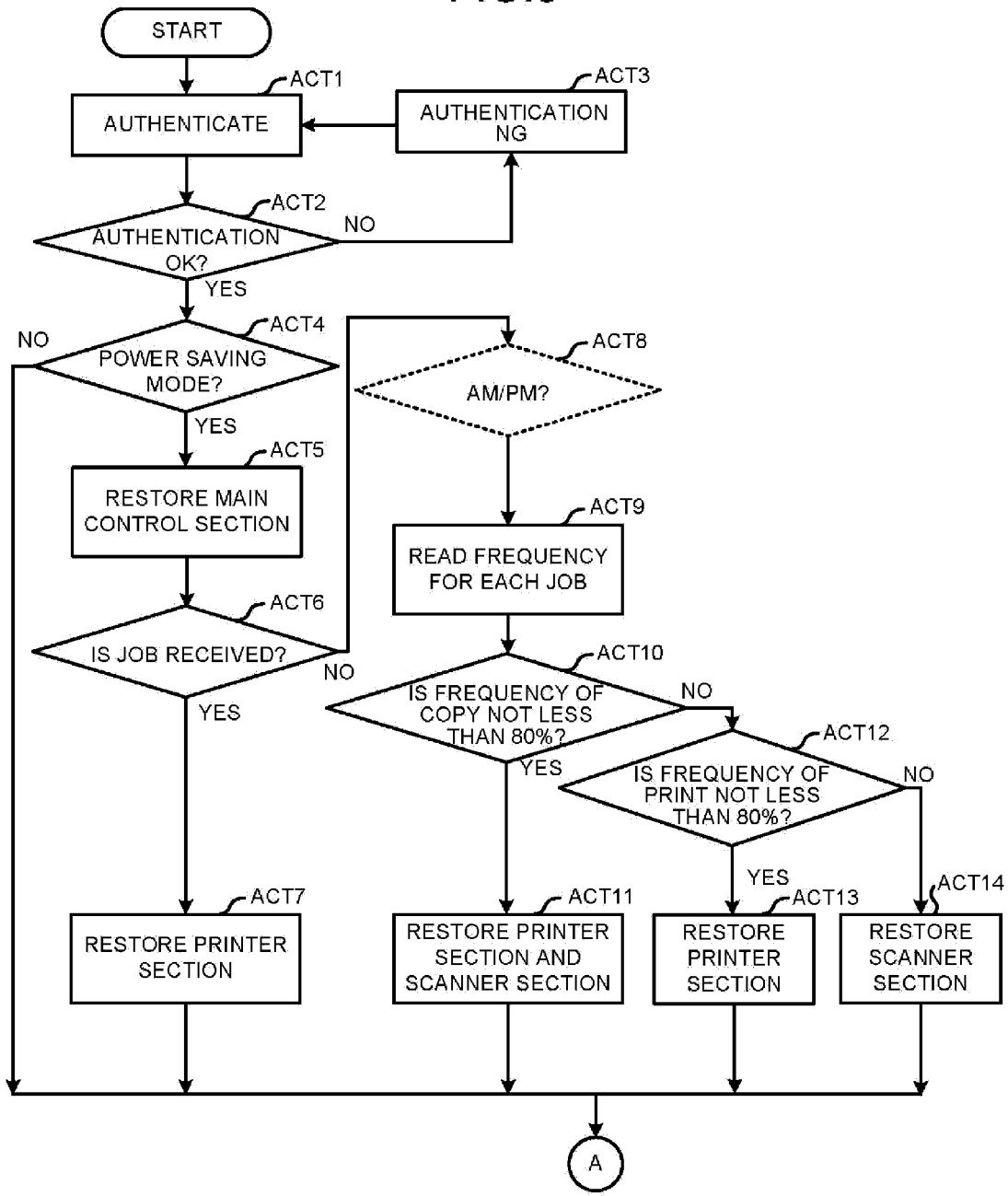

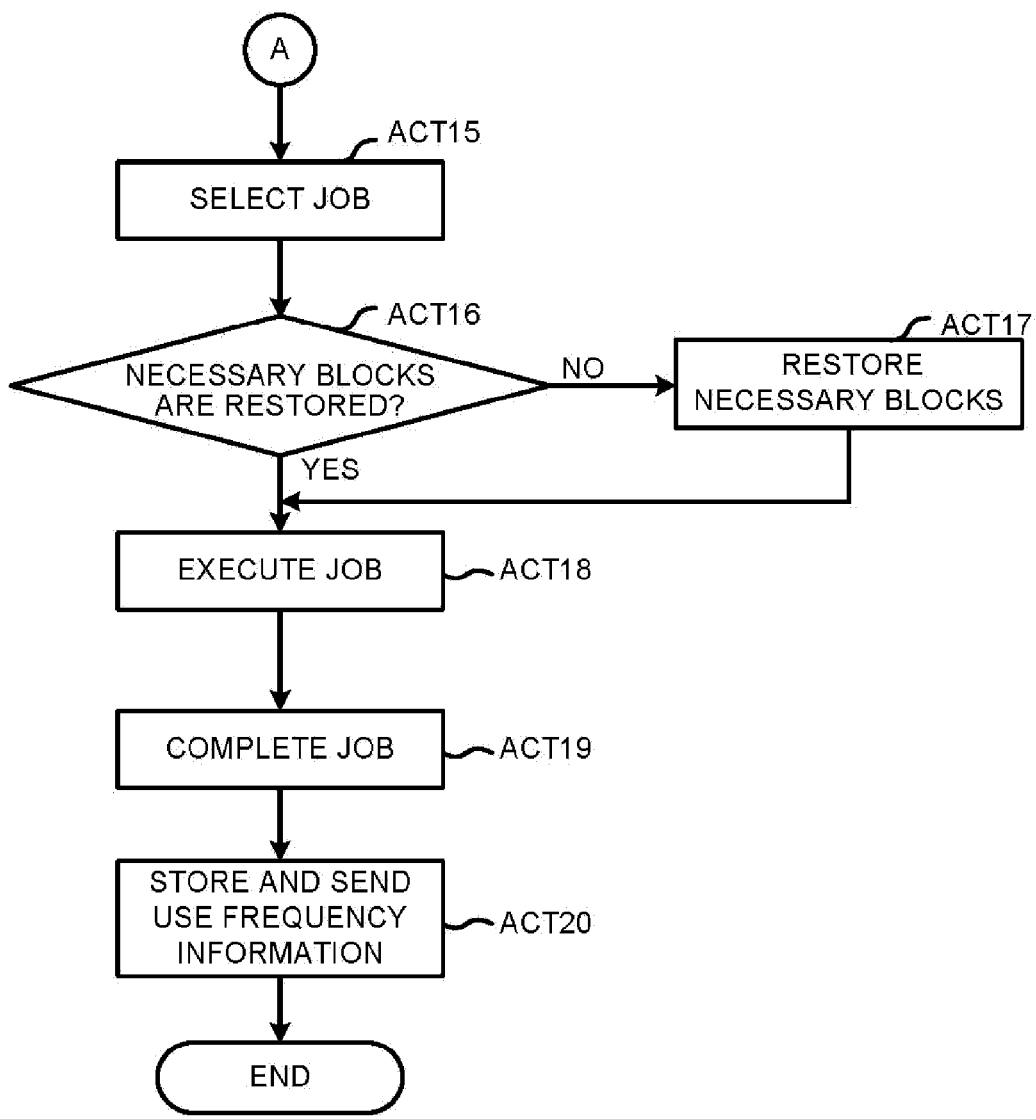

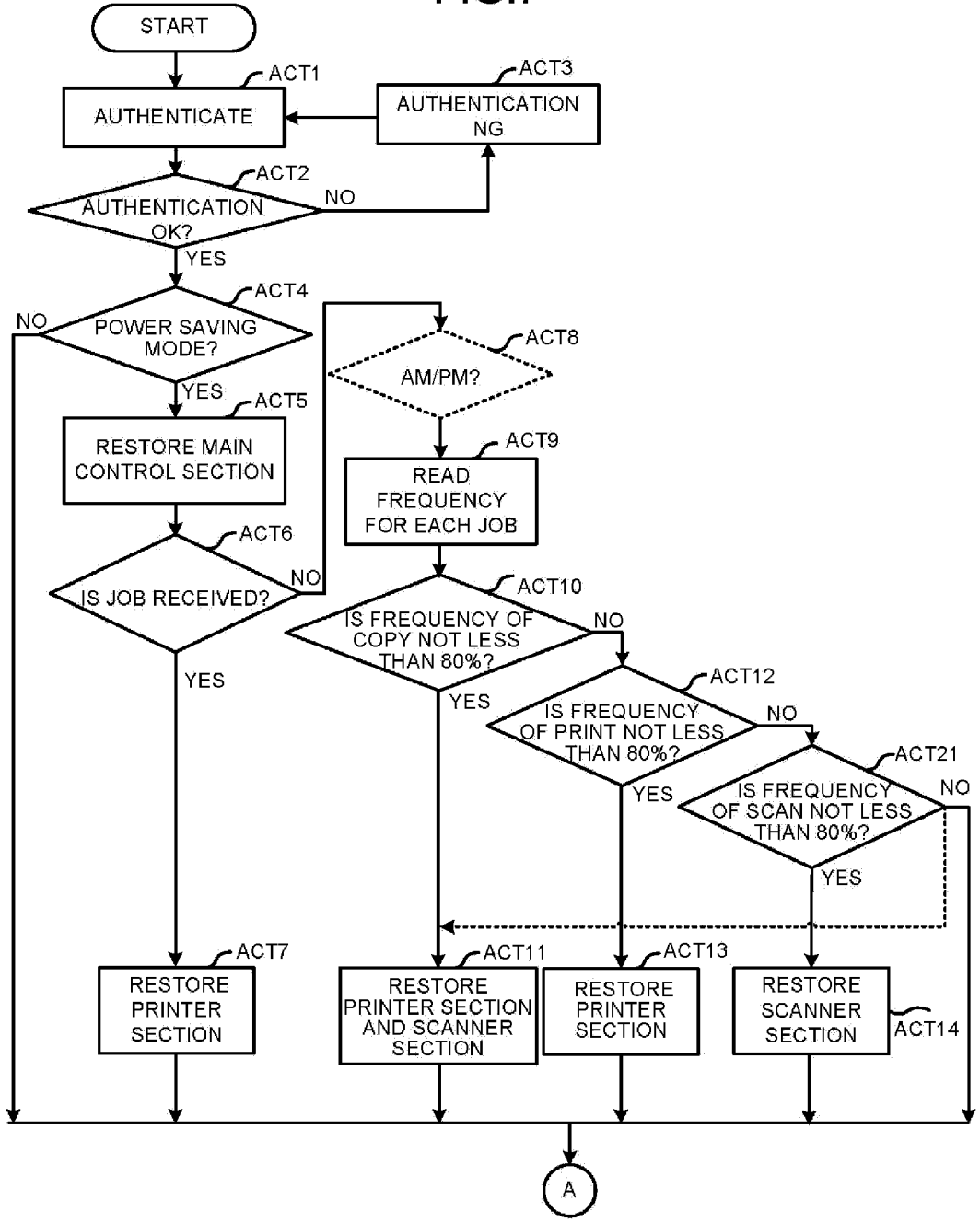

IMAGE FORMING APPARATUS TO REDUCE POWER CONSUMPTION, CONTROL METHOD FOR THE SAME AND RECORDING MEDIUM

FIELD

Embodiments described herein relate generally to an image forming apparatus which seeks to reduce power consumption, a control method for the image forming apparatus and a recording medium.

BACKGROUND

Conventionally, in an image forming apparatus such as a digital multi-function peripheral called as a MFP (multi-function peripheral), a scanner section and a printer section are arranged. A document is read and the read image data is processed by the scanner section, and then the processed image data is printed by the printer section.

Further, in recent years, there is a MFP which is provided with not only a copy function, a print function and a scanner function, but also a FAX (facsimile) function using the public line. In addition, there is also a MFP linked with an external personal computer and the like by connecting the MFP with a network.

In such a MFP, various measures have been taken to reduce power consumption. In the past, for example, if an authentication is carried out to authenticate a user through an IC card, the image forming apparatus is restored from the power saving mode to the general mode.

Further, there is also an example in which authority for using the MFP is given to a specific user. If it is authenticated by the MFP that a user is the user who has the authority, the electric power is fed to each block of the MFP, in this way, it is possible to use the MFP.

However, in the past, though the user who has the authority can use the MFP, the electric power is also fed to the unused blocks. Thus, there is a disadvantage that extra power is consumed.

BRIEF DESCRIPTION OF THE DRAWINGS

FIG. 3 is an illustration diagram illustrating an example of a list of use frequency information for each user according to the embodiment;

FIG. 4 is an illustration diagram illustrating another example of a list of use frequency information for each user according to the embodiment;

FIG. 5 is a flowchart illustrating operations for power saving according to the embodiment;

FIG. 6 is a flowchart illustrating other operations for power saving according to the embodiment; and FIG. 7 is a flowchart illustrating another operations for power saving according to the embodiment.

DETAILED DESCRIPTION

Figure 1:
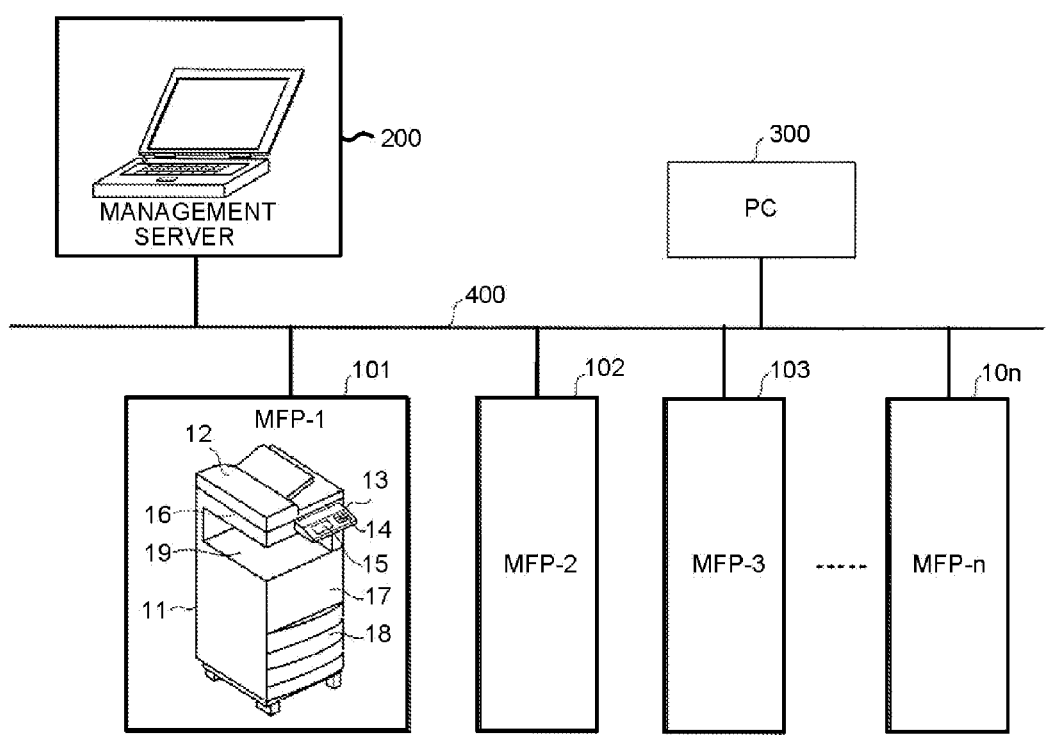
FIG. 1 is a diagram illustrating the constitutions of an image forming apparatus and a management server according to one embodiment.

In accordance with an embodiment, an image forming apparatus comprises:
a plurality of blocks configured to be capable of executing a plurality of jobs;
a power supply control section configured to control the feeding of electric power to the plurality of blocks, and operate the plurality of blocks in a power saving mode or a standby mode;
an authentication section configured to authenticate a user who may use the image forming apparatus;
a storage section configured to store use frequency information of each of the plurality of jobs generated based on the information when the user executes the jobs; and
a control section configured to acquire the use frequency information of the user authenticated by the authentication section from the storage section; and control to feed, when there is a job of which the acquired use frequency is higher than a given frequency, electric power to only the blocks that are required to execute the job.

Hereinafter, an image forming apparatus according to the embodiment is described in detail with reference to the accompanying drawings. Further, the same components are applied with the same reference numerals in the drawings, and the description thereof is not provided.

A First Embodiment

FIG. 1 is a diagram illustrating the constitutions of an image forming apparatus and a management server according to the first embodiment. In FIG. 1, a plurality of image forming apparatuses 101, 102 . . . 10n and a management server 200 are connected with each other through a network 400 such as a LAN and the like. The image forming apparatuses 101, 102 . . . 10n are, for example, the digital multi-function peripherals called as the MFPs (Multi-Function Peripherals).

The image forming apparatuses 101, 102 . . . 10n are referred to as MFPs below, and each of them is respectively indicated as MFP-1, MFP-2 . . . MFP-n. Since the MFPs 101, 102 . . . 10n have the same function, the MFP 101 is exemplified as an example.

There is a document table at the upper portion of a main body 11 of the MFP 101. An automatic document feeder (ADF) 12 is arranged at the document table in an openable manner. An operation panel 13 which includes various operation keys 14 and a touch panel type display section 15 is arranged at the upper portion of the main body 11.

A scanner section 16 serving as an image reading section is arranged below the ADF 12 in the main body 11. The scanner section 16 reads the document sent by the ADF 12. The scanner section 16 further reads the document placed on the document table to generate image data. A printer section 17 serving as an image output section is arranged at the center in the main body 11. In addition, a plurality of cassettes 18 which houses paper having various sizes is arranged at a further lower portion of the main body 11.

The printer section 17 includes, for example, a photoconductive drum, a laser and the like. The printer section 17 processes the image data read by the scanner section 16, or the image data created by a PC (Personal Computer) and the like to transfer a toner image to a paper. The printer section 17 further includes a fixing device. The paper to which the toner image is transferred is to be conveyed to the fixing device which is, for example, provided with a heat roller and a press roller opposite to each other. When the paper passes through between the heat roller and the press roller, the toner image transferred to the paper is fixed on the paper. The paper on which the image is fixed by the printer section 17 is discharged to a paper discharge section 19.

The management server 200 is connected with each of the MFPs 101, 102 . . . 10n via the network 400.

Hereinafter, the constitution of control systems of the MFPs 101, 102 . . . 10n is described. Since the MFPs 101, 102, 103 . . . 10n have identical constitution, the MFP 101 is exemplified as an example.

Figure 2:
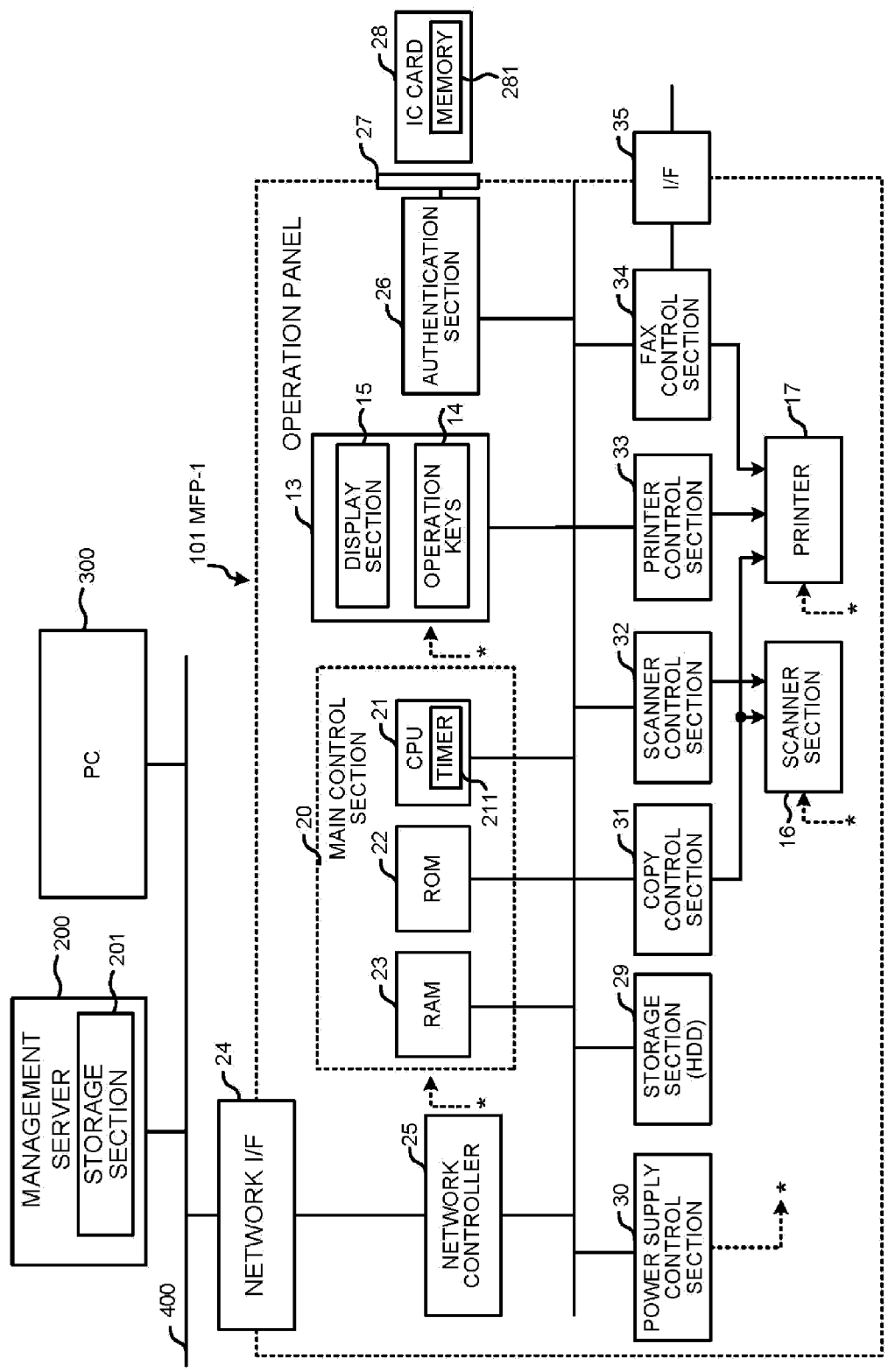
FIG. 2 is a block diagram illustrating a control system of the image forming apparatus according to the embodiment.

FIG. 2 is a block diagram illustrating the control system of the MFP 101. The MFP 101 is equipped with a main control section 20 which includes a CPU 21, a ROM (Read Only Memory) 22, and a RAM (Random Access Memory) 23. The CPU 21 is connected to a PCI bus (Peripheral Component Interconnect Bus) 50. The CPU 21 further includes a timer 211.

The ROM 22 and the RAM 23 are connected to the PCI bus 50. Various control program data required for the operations of the MFP 101 is stored in the ROM 22. The RAM 23 stores the control information when each section operates.

Further, the operation panel 13 which includes the operation keys 14 and the display section 15 is connected to the PCI bus 50. The operation keys 14 include various keys for setting operation conditions. The various keys are, for example, a start key, numeric keys, a print key, a copy key, a scan key, a set/registration key and the like. Further, the display section 15 is, for example, a touch panel type display constituted by liquid crystal material. After the MFP 101 operates, various kinds of information is displayed on the display section 15.

The operation keys 14 and the display section 15 accept operations of a user. The operation panel 13 inputs various instructions of the user by accepting operations of the user.

Further, a network interface (I/F) 24 is arranged in the MFP 101. The network I/F 24 is connected to the PCI bus 50 via a network controller 25. The network I/F 24 is capable of connecting with external devices such as the management server 200, and a PC (Personal computer) 300 through the network 400. The network controller 25 controls the data transmission/reception with the external devices via the network I/F 24.

Further, an authentication section 26 is connected to the PCI bus 50. A card reader 27 which reads the information of an IC card 28 is connected with the authentication section 26. The information of the IC card 28 held by the user is read by the card reader 27, and then sent to the authentication section 26. The authentication section 26 authenticates the holder (user) of the IC card to determine whether or not it is the user who may use the MFP 101. Further, the authentication section 26 acquires the user information stored in the IC card.

Further, a storage section 29 such as a HDD and the like is connected to the PCI bus 50. The image data generated when a printing processing is carried out by the printer section 17 is stored in the storage section 29. The image data is stored in the storage section 29 and read from the storage section 29 under the control of the CPU 21.

Further, a power supply control section 30 is connected to the PCI bus 50. The power supply control section 30 carries out, for each block of the MFP 101, the supply (feeding) and the stopping of the power supply voltage. The power supply control section 30 controls the main control section 20, the scanner section 16, the printer section 17 and the operation panel 13 to be in an energized state, and sets the MFP 101 to the power saving mode such as a ready state, a sleep state and the like.

Further, a copy control section 31, a scanner control section 32, a printer control section 33 and a FAX control section 34 are connected to the PCI bus 50. The copy control section 31 controls a function of copying the image data read by the scanner section 16 using the printer section 17. The scanner control section 32 controls a scan function of reading documents using the scanner section 16, and a file function of storing the scanned image data in the PC 300.

The printer control section 33 controls a print function using the printer section 17 or a network print function. The network print function refers to a function of printing the image data sent from the external device such as the PC 300 and the like. The FAX control section 34 is connected to an interface 35 for transmitting and receiving data via a line (not shown).

The MFP 101 of the embodiment comprises an authentication device including the card reader 27 and the authentication section 26 as shown in FIG. 2. The MFP 101 may be operated in a standby mode in which jobs can be executed and a power saving mode in which power consumption is reduced.

The standby mode is a mode in which the MFP 101 can operate immediately when the operation panel 13 is operated. The power saving mode is a mode in which the electric power is fed to only necessary blocks and the power consumption can be reduced. If the operation panel 13 is operated in the power saving mode, the MFP 101 is restored from the power saving mode to the standby mode.

If the MFP 101 is restored from the power saving mode to the standby mode, the electric power is fed to all blocks of the MFP 101. In the present embodiment, the electric power is respectively fed to the main control section 20, the reading section (scanner section 16), and the output section (printer section 17), if needed.

Further, the user information is stored in the RAM 23 serving as a storage section. In addition to the user IDs for authentication, the user information also includes use frequency information indicating that each user utilizes which job function. That is, the use frequency information indicates that how often the user utilizes any of the printer function, the copy function and the scan function. Further, the IC card 28 includes a memory 281 in which the user ID of the user who holds the IC card 28 is stored. In addition, the use frequency information of the user may be stored in the memory 281.

The list in FIG. 3 illustrates an example of the user information stored in the RAM 23. The user information includes the use frequency information for each job of each user. For example, when the user executes each job of "copy", "print" and "scan", the execution times are stored in the RAM 23 or the memory 281 of the IC card 28. The CPU 21 calculates the use frequency of each job according to the cumulative value of times of each job. The calculated use frequency information is stored in the RAM 23 or the memory 281. The use frequency information for each job can be, for example, represented as shown in FIG. 3.

In FIG. 3, the use frequency (%) of each job of copy, print and scan of each user (A~E) is illustrated. For example, as for the user A, the use frequency of print and scan is respectively 10% while the use frequency of copy is 80%. Further, as for the user B, the use frequency of copy is 10%, and the use frequency of print is 80%. As a result, the use frequency of scan is 10%.

As shown in FIG. 3, by storing the use frequency information of each user, it can be aware that: as for the user A, the use frequency of copy is high; as for the user B, the use frequency of print is high; and as for the user C, the use frequency of scan is high, for example. Further, it can be aware that each function of copy, print and scan is averagely utilized by the user D and user E.

Further, another example of the user information is illustrated in FIG. 4. In FIG. 4, in addition to storing the execution times for each job, other parameters such as temporal information when the user utilizes the MFP 101 are added. Further, the temporal information means the information relating to the time such as hour and minute, date and time, day of week, month and year, and the like.

In FIG. 4, an example of the user information in which the time band during which the user utilizes the MFP 101 serving as the temporal information is, for example, classified into AM and PM is illustrated.

In the list in FIG. 4, information of the use frequency (%) of each job of copy, print and scan of each user (A~E) which is classified into the information in AM and the information in PM is contained. For example, as for the user A, the use frequency of copy is reduced to 20% in PM while the use frequency of copy is 80% in AM. Further, the use frequency of print and scan is not greater than 40% both in AM and PM.

Further, as for the user B, the use frequency of print is reduced to 40% in AM while the use frequency of print is 80% in PM. Further, the use frequency of copy and scan is not greater than 40% both in AM and PM.

As shown in FIG. 4, by storing the use frequency of each user in different time bands, it can be aware that as for the user A, the use frequency of copy in AM is high; as for the user B, the use frequency of print in PM is high; and as for the user C, the use frequency of scan in AM is high, for example.

Further, the reason why the use frequency for each user is different is that the departments the users belong to are different. For example, the user of the design department often prints documents, while the user of the management department often copies documents, in this way, the use frequency is varied. Further, in addition to the date and time, the use frequency may be calculated and stored in different day of week, month and the like as the parameters of the temporal information. Further, a statutory holiday, a season, an anniversary and the like may be used as the temporal information.

Further, the example in which the use frequency for each user is calculated by the CPU 21, and then is stored in the RAM 23 is described above. However, the execution times of jobs of each user may be sent to the management server 200. The management server 200 receives information from the MFP 101. The management server 200 further calculates the use frequency of each job of each user and stores the calculated use frequency in the storage section 201.

In a case in which the use frequency information of each user is stored in the management server 200, the MFP 101 inquires of the management server 200 about presence/absence of the user information during the user authentication process. If there is information of the user according to the inquired result, the MFP 101 may read the frequency information of the authenticated user from the storage section 201 and utilize it.

The management server 200 can stores or calculates not only the use frequency information in the MFP 101, but also the use frequency information in other MFPs (MFP 102, MFP 103 and the like).

In the image forming apparatus according to the embodiment, the use frequency information of each job of the user is acquired during the user authentication process. Then, the blocks that are restored from the power saving mode to the standby mode are determined and the electric power is fed to these blocks. For example, if a user is one for whom the use frequency of scan is high and the use frequency of copy and print is low, it is controlled that the electric power is fed to only the scanner section 16 but not fed to the printer section 17. It is possible to reduce the power consumption by feeding electric power to only the necessary blocks.

That is, the image forming apparatus is in the power saving mode when the IC card is authenticated in the past, while it is in the standby mode if the authentication is carried out in the present embodiment. However, even if the job to be executed by the user is only scan, the printer section is also restored to the standby mode and the power is consumed.

FIG. 5 and FIG. 6 are flowcharts illustrating the operations for power saving in the present embodiment. The operations in FIG. 5 and FIG. 6 are carried out according to the programs stored in the ROM 22 under the control of the CPU 21.

That is, in the present embodiment, the list of use frequency information of the user is acquired, and the use frequency for each job of the user is determined. Further, if it is a job of which the use frequency is not less than a set value (for example, 80%), it is predicted that the job is a job having a high possibility that the user will execute it. Then, as the predicted result, the electric power is fed to only the blocks that are required to execute the job. Hereinafter, the detailed description is provided.

In FIG. 5, the authentication section 26 carries out the authentication of the user based on the information of the IC card 28 read by the card reader 27 in ACT 1. The CPU 21 determines whether or not the user authentication is correctly carried out in ACT 2. In a case in which the user authentication cannot be carried out, the CPU 21 displays a message (authentication NG) indicating that the authentication cannot be carried out on the display section 15 in ACT 3, and then returns to ACT 1.

If the user authentication can be carried out in ACT 2 (YES in ACT 2), the CPU 21 enters the processing in ACT 4. In ACT 4, it is determined that whether or not the current mode of the MFP 101 is the power saving mode. If the current mode is the power saving mode (YES in ACT 4), ACT 5 is taken. In ACT 5, the CPU 21 controls the power supply control section 30 to feed electric power to the main control section 20 such that the main control section 20 is restored from the power saving mode to the standby mode.

Further, if the determination in ACT 4 is NO, it is determined that the current mode is the standby mode, and the processing proceeds to a job selection in ACT 15 in FIG. 6. The operations in FIG. 6 are described later.

After the CPU 21 enables the main control section 20 to restore to the standby mode in ACT 5, the CPU 21 determines whether or not a print job is received in ACT 6. In ACT 6, it is determined that whether or not the print job is received from the PC 300 through the network 400, and whether or not there is a FAX reception via the interface 35. In a case of receiving the print job in ACT 6, the CPU 21 controls the power supply control section 30 to feed electric power to the printer section 17 in ACT 7. The printer section 17 is restored from the power saving mode to the standby mode. Thus, in a case in which there is the print job from the PC 300 or the FAX reception, the print job is carried out by the printer section 17.

On the other hand, in a case of receiving no print job in ACT 6 (NO in ACT 6), ACT 8 is taken. In ACT 8, the CPU 21 determines whether the current time band is AM or PM based on the information of the timer 211. Herein, in a case in which the use frequency information in FIG. 3 is used, ACT 8 is omitted and the processing proceeds to ACT 9. ACT 8 is taken to carry out the determination in a case of using the use frequency information which is classified into the information in AM and the information in PM (FIG. 4).

In a case of using the use frequency information in FIG. 3, the CPU 21 reads the use frequency information of each job of the authenticated user from the RAM 23 in ACT 9, and then ACT 10 is taken.

Further, in a case of using the use frequency information in FIG. 4, the CPU 21 reads the use frequency information of the authenticated user from the RAM 23 in ACT 9. Herein, in ACT 9, the CPU 21 reads the use frequency information in AM if the current time is in AM, and reads the use frequency information in PM if the current time is in PM.

Then, the CPU 21 determines whether or not the use frequency of "copy" is not less than a pre-determined frequency (for example, not less than 80%) in ACT 10. If the determination in ACT 10 is YES, ACT 11 is taken. In ACT 11, the CPU 21 controls the power supply control section 30 to feed electric power to the printer section 17 and the scanner section 16. The printer section 17 and the scanner section 16 are restored from the power saving mode to the standby mode to be a state capable of executing copy jobs.

If the determination in ACT 10 is NO, ACT 12 is taken. In ACT 12, the CPU 21 determines whether or not the use frequency of "print" is not less than a pre-determined frequency (for example, not less than 80%). If the determination in ACT 12 is YES, ACT 13 is taken. In ACT 13, the CPU 21 controls the power supply control section 30 to feed electric power to the printer section 17. The printer section 17 is restored from the power saving mode to the standby mode to be a state capable of executing print jobs.

On the other hand, if the determination in ACT 12 is NO, ACT 14 is taken. In ACT 14, the CPU 21 controls the power supply control section 30 to feed electric power to the scanner section 16. The scanner section 16 is restored from the power saving mode to the standby mode to be a state capable of executing scan jobs. That is, if the determination in both ACT 10 and ACT 12 is NO, the CPU 21 determines that the use frequency of "scan" is high, and then ACT 14 is taken.

According to the use frequency information in FIG. 3, as for the user A, the use frequency of "copy" is not less than 80%. Thus, when the user A uses the MFP 101, the electric power is fed to the printer section 17 and the scanner section 16 to execute a copy job according to the determination result (YES) in ACT 10.

Further, as for the user B, the use frequency of "print" is not less than 80%. Thus, when the user B uses the MFP 101, the electric power is fed to the printer section 17 to execute a print job according to the determination result (YES) in ACT 12. At this time, the scanner section 16 is in the power saving mode, thus reducing the power consumption.

As for the user C, the use frequency of "scan" is not less than 80%. Thus, when the user C uses the MFP 101, the electric power is fed to the scanner section 16 to execute a scan job according to the determination result (NO) in ACT 12. At this time, the printer section 17 is in the power saving mode, thus reducing the power consumption.

The processing proceeds to ACT 15 in FIG. 6 after the processing in ACT 7, ACT 11, ACT 13 and ACT 14 is carried out. In ACT 15 in FIG. 6, a job is selected by the user. In ACT 16, the CPU 21 determines whether or not the blocks that are required to execute the job selected by the user are restored to the standby mode.

In a case where the determination in ACT 16 is NO, in ACT 17, the CPU 21 controls the power supply control section 30 to feed electric power to the blocks that are required to execute the job such that the necessary blocks are restored to the standby mode. For example, when the determination in all of ACT 6, ACT 10 and ACT 12 is NO, the scanner section 16 is restored to the standby mode in ACT 14. However, when the user selects a print job or a copy job in ACT 15, it is needed to restore the printer section 17. As a result, the printer section 17 is restored to the standby mode in ACT 17.

In ACT 18, the CPU 21 executes the job selected by the user. If the execution of the job is completed in ACT 19, the CPU 21 stores the use information (copy, print and scan information) of the user in the RAM 23 in ACT 20. Or, the use information of the user is sent to the management server 200. The CPU 21 calculates the use frequency based on the use information newly stored in the RAM 23, updates the use frequency for each user and stores it in the RAM 23. The updated use frequency information may be stored in the memory 281 of the IC card 28. Or, the management server 200 re-calculates the use frequency based on the received use information. Then, the use frequency information for each user is updated and stored in the storage section 201.

Further, assuming that the department the user belongs to is changed, the use frequency information is reset every a pre-determined period such as one year, half a year and the like, and the use frequency information may be newly calculated.

According to the embodiment described above, when the user executes a job, the job to be used by the user can be predicted in advance and the electric power can be fed to the blocks that are required to execute the job based on the use frequency information of the user. Further, it is possible to realize the reduction in power consumption by stopping the feeding of electric power to the blocks that are not required to execute the job.

Further, in the flowchart in FIG. 5, in a case where there is no job of which the use frequency is not less than a set value (for example, not less than 80%), the electric power is not fed to the scanner section 16 and the printer section 17 until the user selects a job in ACT 15. In this way, there is an effect if the reduction of power consumption is prioritized. On the contrary, it takes much time to become the state capable of executing jobs. Therefore, in a case where there is no job of which the use frequency is not less than a set value (for example, not less than 80%) in the list for each user, the electric power may be fed to the scanner section 16 and the printer section 17 immediately in such a manner that the scanner section 16 and the printer section 17 are moved to a state capable of executing jobs.

FIG. 7 is a flowchart illustrating another operations for power saving. In the flowchart in FIG. 7, the processing from ACT 1 to ACT 14 is the same as that in FIG. 5. Therefore, the detailed description is not provided. Act 21 is a newly added determination processing.

In FIG. 7, when the use frequency of "print" is below 80% in ACT 12, ACT 21 is taken. In ACT 21, the CPU 21 determines whether or not the use frequency of "scan" is not less than a pre-determined frequency (for example, not less than 80%). If the determination in ACT 21 is YES, ACT 14 is taken. In ACT 14, the CPU 21 controls the power supply control section 30 to feed electric power to the scanner section 16. The scanner section 16 is restored from the power saving mode to the standby mode to be a state capable of executing scan jobs.

Further, if the determination in ACT 21 is NO, the processing proceeds to ACT 15 in FIG. 6. The processing after ACT 15 is as described above. Thus, the electric power is not fed to the scanner section 16 and the printer section 17 until the user selects a job in ACT 15, which leads to the reduction in power consumption.

On the other hand, it takes much time if the necessary blocks are not restored until the operation in ACT 15 is performed. Therefore, if prioritizing the convenience, ACT 11 is taken as indicated by the dotted line in a case where the determination in ACT 21 is NO. In ACT 11, the CPU 21 controls to feed electric power to the scanner section 16 and the printer section 17 to be a state capable of executing jobs.

A Second Embodiment

In the embodiment described above, the power saving when the user starts to use the MFP 101 is described. In the second embodiment, the power saving is obtained by stopping the feeding of electric power to the blocks that are not required to execute a job after the user uses the MFP.

A case in which the list in FIG. 3 is used is described as an example. For example, it is assumed that the user A is copying a document in a state in which the electric power is being fed to the scanner section 16 and the printer section 17. Herein, if the user A ends the copy process, the electric power is continuously fed to the scanner section 16 and the printer section 17 for a pre-determined period by a sleep timer and the like.

At this time, since the user B uses the MFP 101, if the user authentication is carried out, the CPU 21 reads the use frequency information of the user B from the RAM 23. As for the user B, since the use frequency of print is not less than 80%, the CPU 21 stops the feeding of electric power to the scanner section 16 and feeds electric power to only the printer section 17.

Alternatively, a case in which the user C uses the MFP 101 in a state where the electric power is fed to the scanner section 16 and the printer section 17 is considered. In this case, if the user C is authenticated, the CPU 21 reads the use frequency information of the user C from the RAM 23. As for the user C, since the use frequency of scan is not less than 80%, the CPU 21 stops the feeding of electric power to the printer section 17 and feeds electric power to only the scanner section 16.

Thus, the job to be used by the user can be predicted in advance and the electric power can be fed to the blocks that are required to execute the job based on the use frequency information of the user. Further, it is possible to realize the reduction in power consumption by stopping the feeding of electric power to the blocks that are not required to execute the job.

In the embodiment described above, in the image forming apparatus comprising the authentication device, when the user executes a job, the job to be used by the user can be predicted in advance and the electric power can be fed to the blocks that are required to execute the job. Further, it is possible to realize the reduction in power consumption by stopping the feeding of electric power to the blocks that are not required to execute the job.

Further, in the above description, the determination standard of the use frequency is set to 80% in ACT 10 and ACT 12 in the flowchart in FIG. 5. However, it may also be set to a value other than 80%. The determination standard of the use frequency may be any value, and may be set by the administrator.

Further, in the examples described above, three jobs (copy, print and scan) are described. However, in a case where there is other job, it may be controlled to feed electric power to the blocks that execute the other job, if needed.

Further, a case is described in which the functions for implementing the program are pre-stored in the ROM 22 arranged in the image forming apparatus (MFP) 101 in the present embodiment. However, the present invention is not limited to this, and same functions may be downloaded to the image forming apparatus 101 from the network 400. Further, same functions may be stored in a recording medium and then installed in the image forming apparatus 101. No limitation is given to the form of the recording medium as long as the recording medium can store programs such as a CD-ROM and the like, and is readable by the image forming apparatus 101. Further, the function achieved by an installed or downloaded program can also be realized through the cooperation with an OS (operating system) installed in the image forming apparatus 101.

Further, the processing indicated by the embodiments may be realized by the hardware, or realized by the application (computer program) that is stored in a storage section such as a memory and executed by an arithmetic section such as the CPU 21 and the like.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming apparatus, comprising:
a plurality of blocks configured to be capable of executing a plurality of jobs;
a power supply control section configured to control the feeding of electric power to the plurality of blocks, and operate the plurality of blocks in a power saving mode or a standby mode;
an authentication section configured to authenticate a user who may use the image forming apparatus;
a storage section configured to store use frequency information of each of the plurality of jobs generated based on the information when the user executes the jobs; and
a control section configured to acquire the use frequency information of the user authenticated by the authentication section from the storage section;
and control to feed, when there is a job of which the acquired use frequency is higher than a given frequency, electric power to only the blocks that are required to execute the job.

2. The apparatus of claim 1, wherein
the control section updates, every time the user executes any of the plurality of jobs, the use frequency information of each user and then stores the updated use frequency information of each user in the storage section.

3. The apparatus of claim 1, wherein
the plurality of jobs includes at least a print job, a copy job and a scan job; and
the plurality of blocks includes a printer section and a scanner section.

4. The apparatus of claim 1, wherein
the control section controls the power supply control section to feed electric power to the blocks that are required to execute the job selected by the user in a case where the use frequency of the authenticated user is lower than the given frequency.

5. The apparatus of claim 1, wherein
the use frequency information of each user is stored according to the use temporal information of users; and
the control section predicts the job to be executed by the user based on the use frequency information corresponding to the use temporal information, and controls to feed electric power to only the blocks that are required to execute the predicted job.

6. A control method for an image forming apparatus, including:
controlling the feeding of electric power to a plurality of blocks that is capable of executing a plurality of jobs, and operating the plurality of blocks in a power saving mode or a standby mode;
authenticating a user who may use the image forming apparatus through an authentication section;
generating the use frequency information of each of the plurality of jobs and storing it in a storage section based on the information when a user executes the jobs; and
acquiring the use frequency information of the user authenticated by the authentication section from the storage section; and controlling to feed, when there is a job of which the acquired use frequency is higher than a given frequency, electric power to only the blocks that are required to execute the job.

7. The method of claim 6, further including:
updating, every time the user executes any of the plurality of jobs, the use frequency information of each user and then storing the updated use frequency information of each user in the storage section.

8. The method of claim 6, further including:
feeding electric power to the blocks that are required to execute the job selected by the user in a case where the use frequency of the authenticated user is lower than the given frequency.

9. The method of claim 6, further including:
storing the use frequency information of each user according to the use temporal information of users,
predicting the job to be executed by the user based on the use frequency information corresponding to the use temporal information; and
feeding electric power to only the blocks that are required to execute the predicted job.

10. A non-transitory computer-readable recording medium for recording programs which enable a computer to execute the following procedures:
controlling the feeding of electric power to a plurality of blocks that is capable of executing a plurality of jobs, and operating the plurality of blocks in a power saving mode or a standby mode;
authenticating a user who may use an image forming apparatus;
generating the use frequency information of each of the plurality of jobs and storing it in a storage section based on the information when a user executes the jobs; and
acquiring the use frequency information of the user authenticated by the authentication section from the storage section; and controlling to feed, when there is a job of which the acquired use frequency is higher than a given frequency, electric power to only the blocks that are required to execute the job.

* * * * *